(12) United States Patent
Punko (10) Patent No.: US 6,708,579 B2
(45) Date of Patent: Mar. 23, 2004

(54) REVERSE DRIVE FOR A SMALL VEHICLE

(75) Inventor: Richard Alexander Punko, Westlock (CA)

(73) Assignee: Lehman Trikes Inc., Westlock (CA)

( * ) Notice: Subject to any disclaimer, the term of this patent is extended or adjusted under 35 U.S.C. 154(b) by 69 days.

(21) Appl. No.: 09/953,415

(22) Filed: Sep. 11, 2001

(65) Prior Publication Data

US 2002/0007688 A1 Jan. 24, 2002

(30) Foreign Application Priority Data

Mar. 16, 2000 (CA) .............................................. 2347702

(51) Int. Cl.$^7$ ............................................... F02N 15/02
(52) U.S. Cl. ............................ 74/425; 74/6; 74/421 A; 180/65.2; 192/69.81
(58) Field of Search .......................... 192/69.81; 74/6, 74/22 A, 63, 325, 333, 404, 404.5, 424.7, 425, 473.1, 473.14, 473.15, 421 A, 7 D; 180/65.2, 65.3

(56) References Cited

U.S. PATENT DOCUMENTS

| | | | | |
|---|---|---|---|---|
| 4,683,994 A | * | 8/1987 | Weisenfelder | 192/69.81 X |
| 4,763,538 A | * | 8/1988 | Fujita et al. | 74/6 |
| 4,869,332 A | * | 9/1989 | Fujita et al. | 180/65.2 |
| 4,870,874 A | * | 10/1989 | Ito | 74/6 |
| 4,974,695 A | * | 12/1990 | Politte | 180/65.3 |
| 4,980,591 A | * | 12/1990 | Takanashi et al. | 74/425 |
| 5,024,113 A | * | 6/1991 | Ito et al. | 74/6 |
| 5,069,304 A | * | 12/1991 | Mann | 180/65.3 |

* cited by examiner

*Primary Examiner*—David A. Bucci
*Assistant Examiner*—Colby Hansen
(74) *Attorney, Agent, or Firm*—Davis & Bujold, PLLC (57) ABSTRACT

A reverse drive for a small vehicle includes a primary driven gear through which an external motor imparts a rotary motion to a first shaft. A worm gear is mounted on and rotates with the first shaft. A worm wheel is mounted on and rotates with a second shaft. The worm wheel engages and is rotated by the worm gear with a gear reduction being effected through engagement of the worm gear and the worm wheel so that the second shaft rotates at a slower speed than the first shaft. A clutch is mounted on the second end of the second shaft, which can be moved between an engaged position and a disengaged position.

10 Claims, 11 Drawing Sheets

REVERSE DRIVE FOR A SMALL VEHICLE

FIELD OF THE INVENTION

The present invention relates to a reverse drive for a small vehicle and, in particular, a motorcycle.

BACKGROUND OF THE INVENTION

Many small vehicles, most notably motorcycles, are commonly built without a reverse drive. This is inconvenient as it forces the operator to push the vehicle backwards out of confined spaces. A leader in reverse drive for small vehicles is the Japanese manufacturer of the HONDA brand motorcycle, which holds U.S. Pat. Nos. 4,763,538; 4,869,332; 4,870,874; and 5,024,113. All of these patents teach the use of a first internal combustion motor for a forward drive and a second electric motor for a reverse drive. By way of explanation U.S. Pat. No. 4,763,538 teaches that it is not practical to run the reverse drive off the output shaft of the internal combustion motor used for the forward drive. The reason stated is that the reduction gears required in order to provide a sufficiently slow backing speed are too large to be practical. In contrast, the HONDA references disclose how a second electric motor can be adapted for use as a reverse drive with suitably sized planetary reduction gears. The type of reverse drive disclosed in the HONDA references is not suitable for use in applications with space constraints. For example, the reverse drive disclosed in the HONDA references is not suitable for use with HARLEY-DAVIDSON brand motorcycles.

SUMMARY OF THE INVENTION

The present invention relates to an alternative configuration of reverse drive for a small vehicle.

According to the present invention there is provided a reverse drive for a small vehicle which includes a housing with a first shaft rotatably mounted in the housing. The first shaft has a first end and a second end. The first end of the first shaft extends outside the housing. A primary driven gear is mounted on the first end of the first shaft, such that an external motor engaging the primary driven gear imparts a rotary motion to the first shaft. A worm gear is mounted on and rotates with the first shaft. A second shaft is rotatably mounted in the housing. The second shaft has a first end and a second end. A worm wheel is mounted on and rotates with the second shaft. The worm wheel engages and is rotated by the worm gear with a gear reduction being effected through engagement of the worm gear and the worm wheel so that the second shaft rotates at a slower speed than the first shaft. A clutch is mounted on the second end of the second shaft. Means is provided for moving the clutch between an engaged position and a disengaged position.

The reverse drive, as described above, is comparatively compact. It uses a worm gear and worm wheel combination to effect a gear reduction. The ratio of gear reduction can be varied through the selection of the worm wheel. Although this reverse drive was developed for use on HARLEY-DAVIDSON brand motorcycles, it can be adapted for use with other small vehicles.

Although beneficial results may be obtained through the use of the invention, as described above, even more beneficial results may be obtained through the use of preferred features as are hereinafter described and claimed. It is preferred that the second shaft have two components: an outer shaft and a concentric inner shaft which is axially movable relative to the outer shaft. This concentric shaft arrangement is a compact way of mounting a movable clutch. It is preferred that a spring be used to bias the inner shaft axially to maintain the clutch in the disengaged position. This simplifies the mechanism required to move the clutch, as the clutch need only be moved in one direction to the engaged position by overcoming the biasing force of the spring. It is preferred that a lever be used to move the inner shaft axially to bring the clutch to the engaged position. The lever provides a mechanical advantage to overcome the biasing force of the spring. It is preferred that the clutch have a sawtooth engagement. The sawtooth provides a ramping effect that facilitates engagement with a corresponding sawtooth tooth clutch mounted on a remote end of a drive shaft of the small vehicle. It is preferred that movement of the lever is effected by a cable which extends from the lever to a solenoid. This enables activation of the solenoid to exert a force upon the cable to move the lever.

BRIEF DESCRIPTION OF THE DRAWINGS

These and other features of the invention will become more apparent from the following description in which reference is made to the appended drawings, the drawings are for the purpose of illustration only and are not intended to in any way limit the scope of the invention to the particular embodiment or embodiments shown, wherein.

DETAILED DESCRIPTION OF THE PREFERRED EMBODIMENT

The preferred embodiment, a reverse drive generally identified by reference numeral 10, will now be described with reference to FIGS. 1 through 11.

Figure 1:
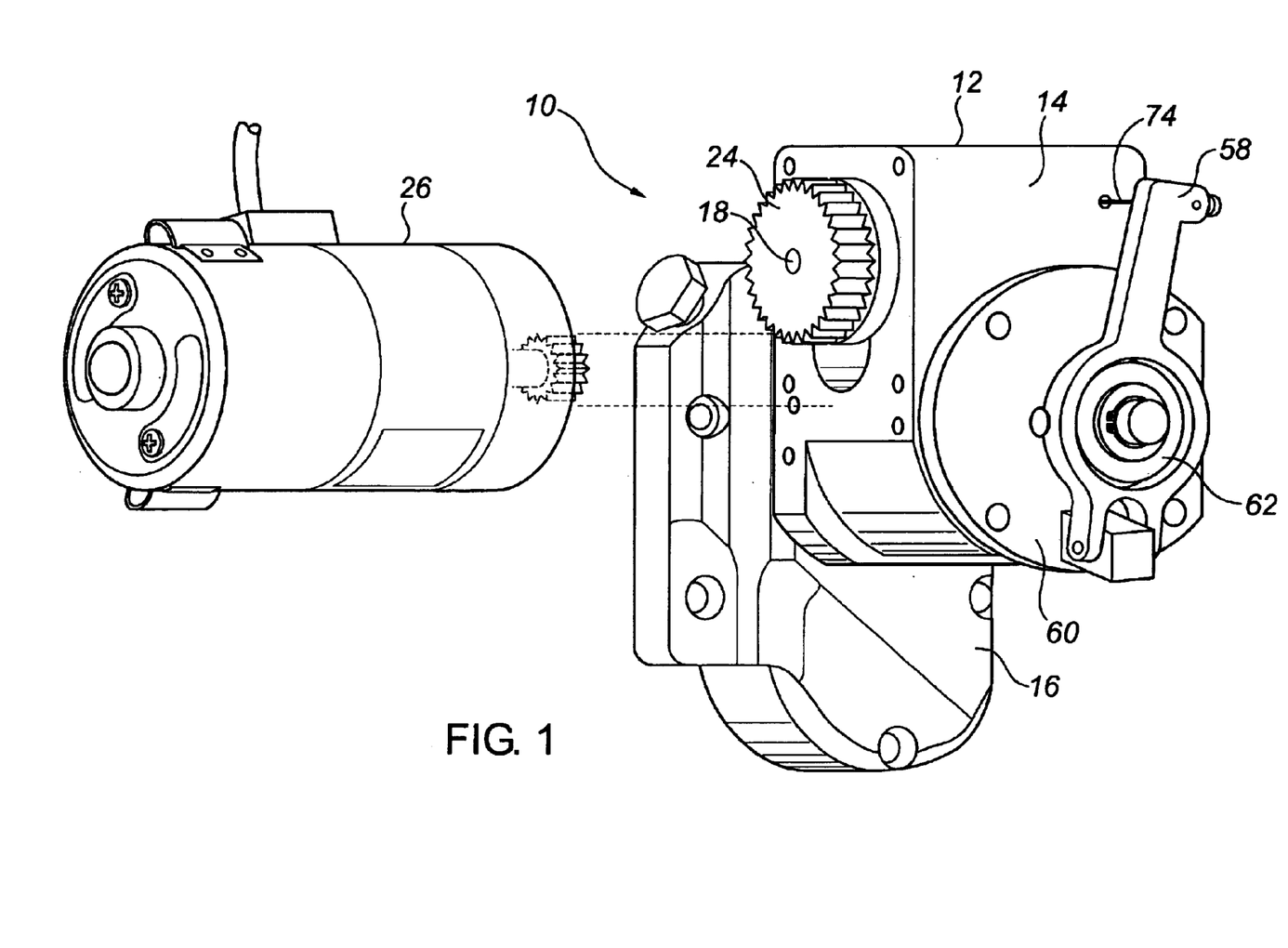
FIG. 1 is a perspective view of a reverse drive fabricated in accordance with the teachings of the present invention.
Figure 2:
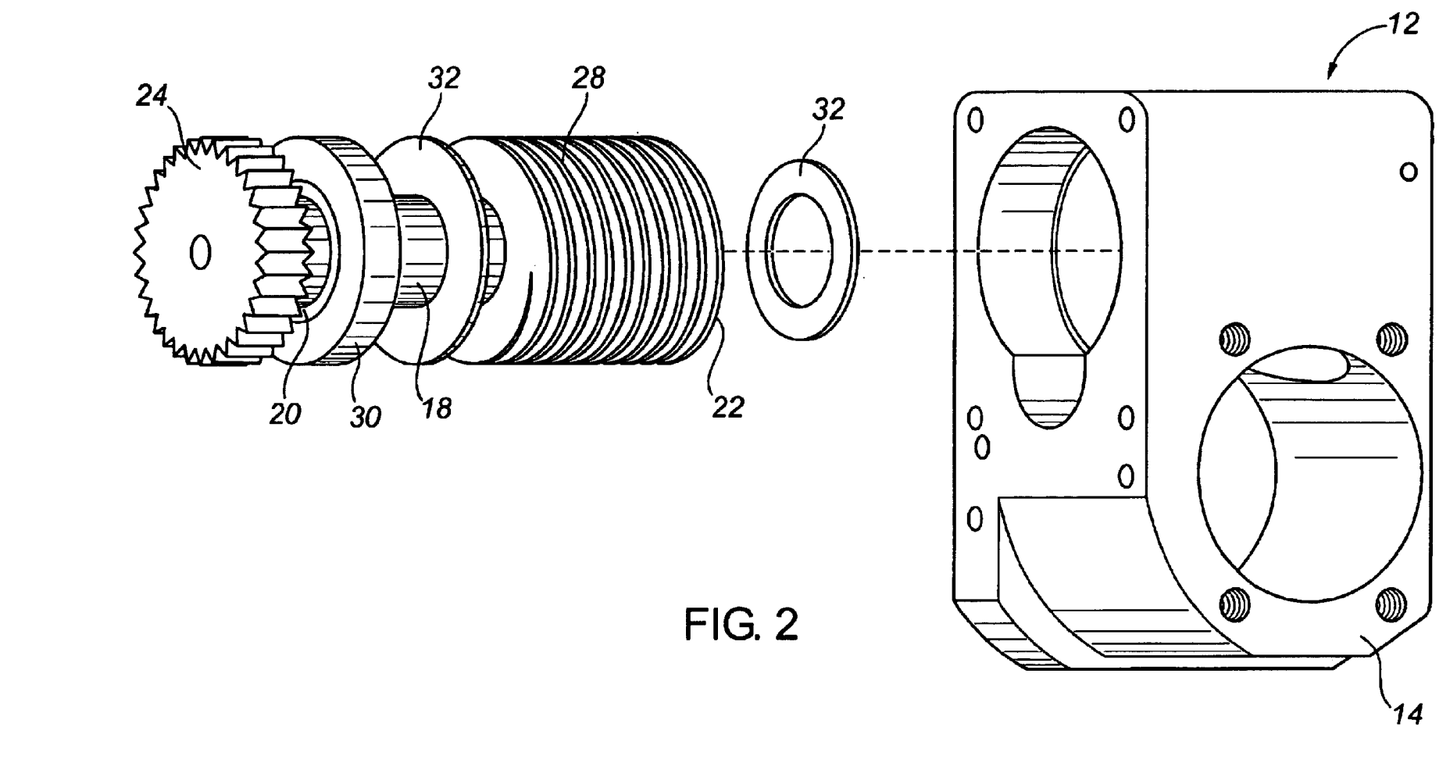
FIG. 2 is a detailed perspective view of a first shaft from the reverse drive illustrated in FIG. 1.
Figure 3:
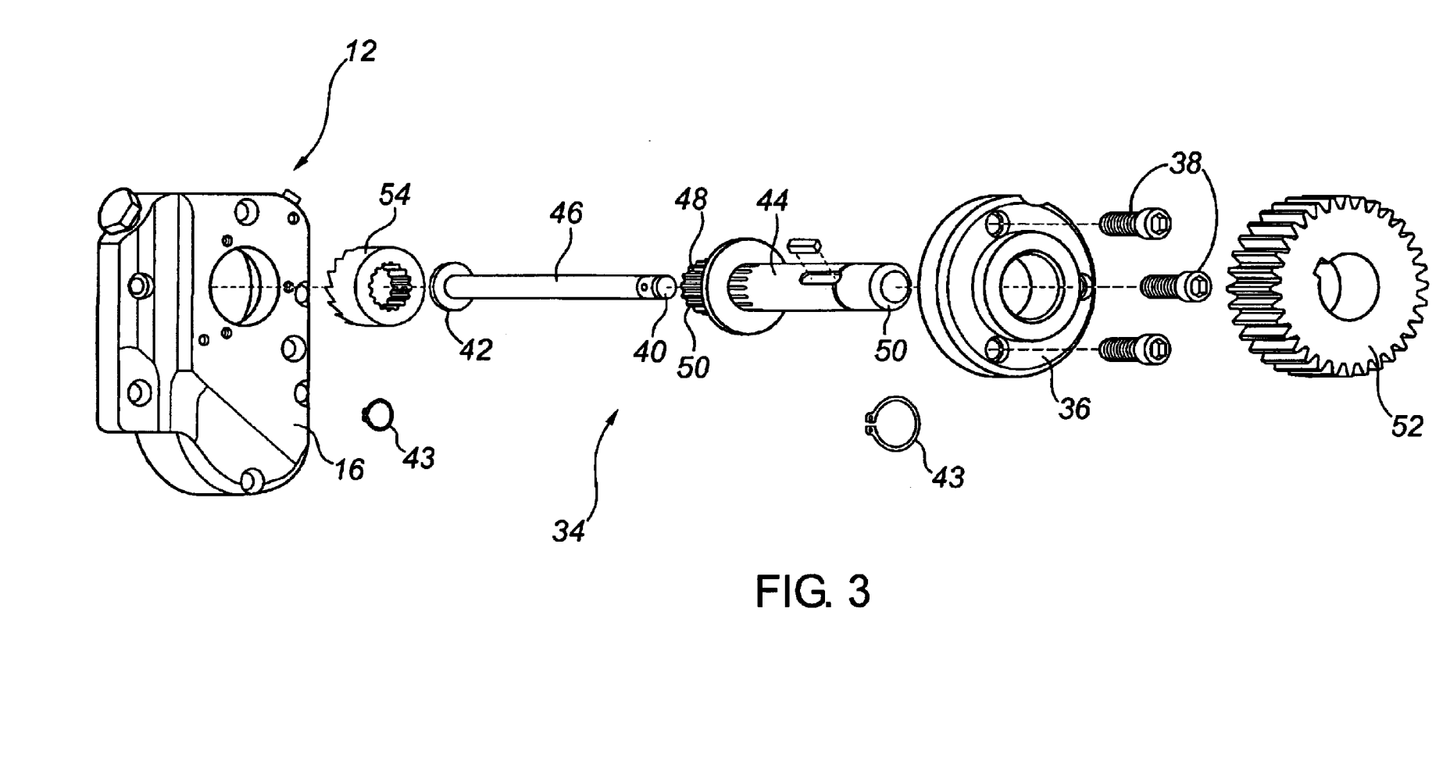
FIG. 3 is an exploded detailed perspective view of a second shaft from the reverse drive illustrated in FIG. 1.
Figure 4:
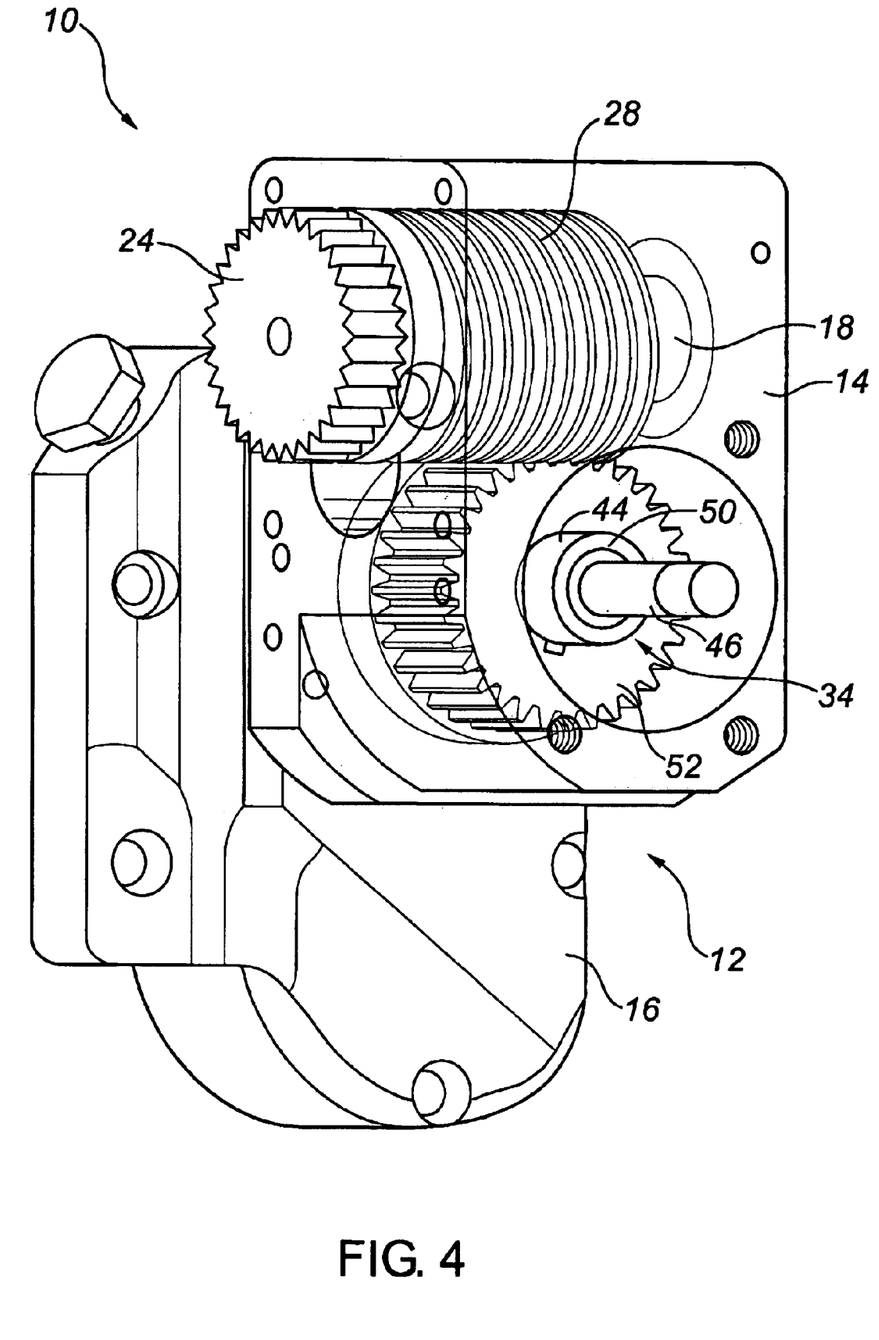
FIG. 4 is a detailed perspective view of a worm and wheel engagement from the reverse drive illustrated in FIG. 1.
Figure 6:
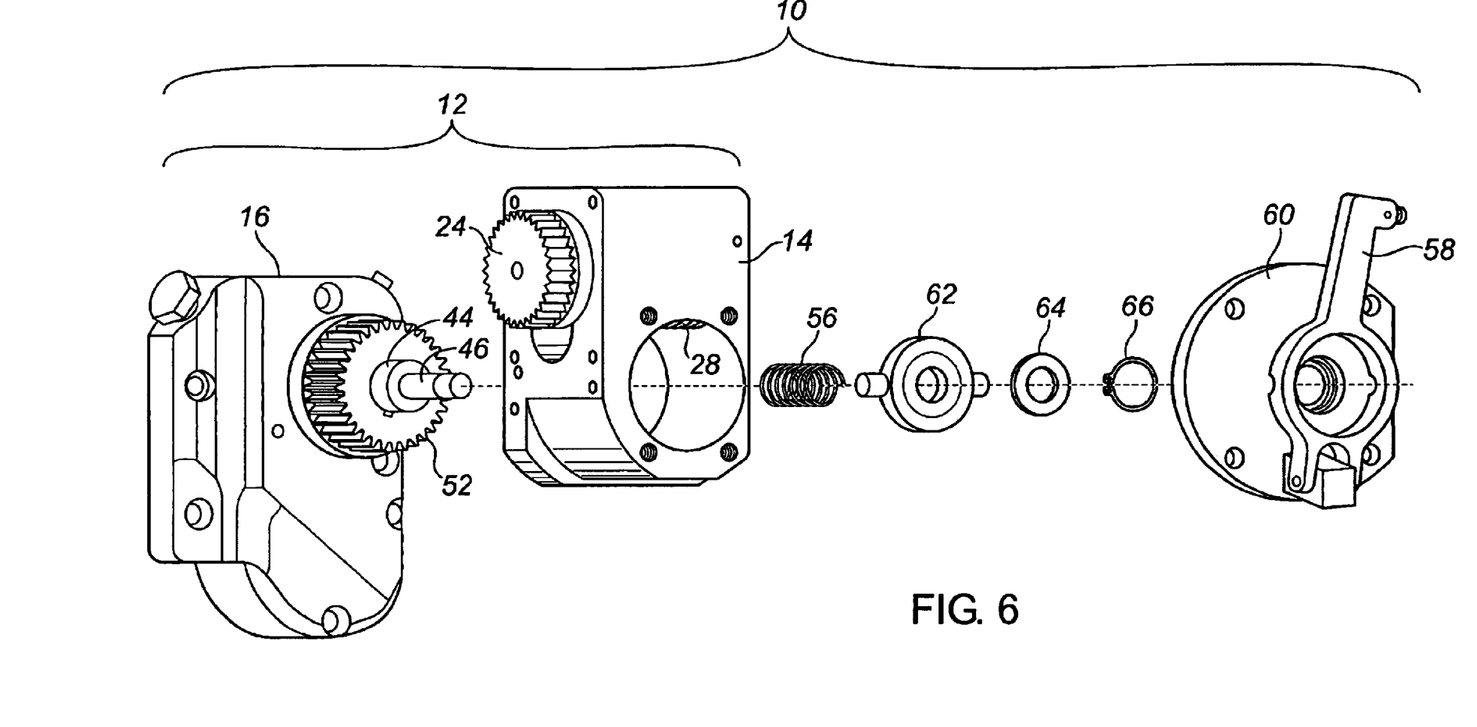
FIG. 6 is a partially exploded detailed perspective view of a clutch activation lever from the reverse drive illustrated in FIG. 1.

Structure and Relationship of Parts:

Referring to FIG. 1, there is provided a reverse drive 10 for a small vehicle which includes a housing 12. Referring to FIG. 6, for ease of assembly, housing 12 includes a first portion 14 and a second portion 16 which are adapted to be secured together. Referring to FIG. 2, a first shaft 18 is rotatably mounted in housing 12. First shaft 18 has a first end 20 and a second end 22. First end 20 of first shaft 18 extends outside housing 12. A primary driven gear 24 is mounted on first end 20 of first shaft 18. Referring to FIG. 1, an external motor 26 engages primary driven gear 24 to impart a rotary motion to first shaft 18. Referring to FIG. 2, a worm gear 28 along with a bearing 30 and thrust washers 32 are mounted on and rotate with first shaft 18. Referring to FIG. 3, a two component second shaft 34 is rotatably mounted in housing 12. A cover 36 with securing bolts 38 is provided for mounting second shaft 34 in section portion 16 of housing 12. Second shaft 34 has a first end 40 and a second end 42. Snap rings 43 are provided at first end 40 and second end 42. Second shaft 34 has an outer shaft 44 and a concentric inner shaft 46. Inner shaft 46 is non-rotatably secured to and is axially movable relative to outer shaft 44. Outer shaft 44 has opposed ends 50. Referring to FIG. 4, inner shaft 46 extends past opposed ends 50 of outer shaft 44. A worm wheel 52 is mounted on and rotates with outer shaft 44 of second shaft 34. Worm wheel 52 engages and is rotated by worm gear 28. A gear reduction that is effected through engagement of worm gear 28 and worm wheel 52 so that second shaft 34 rotates at a slower speed than first shaft 18.

Figure 5:
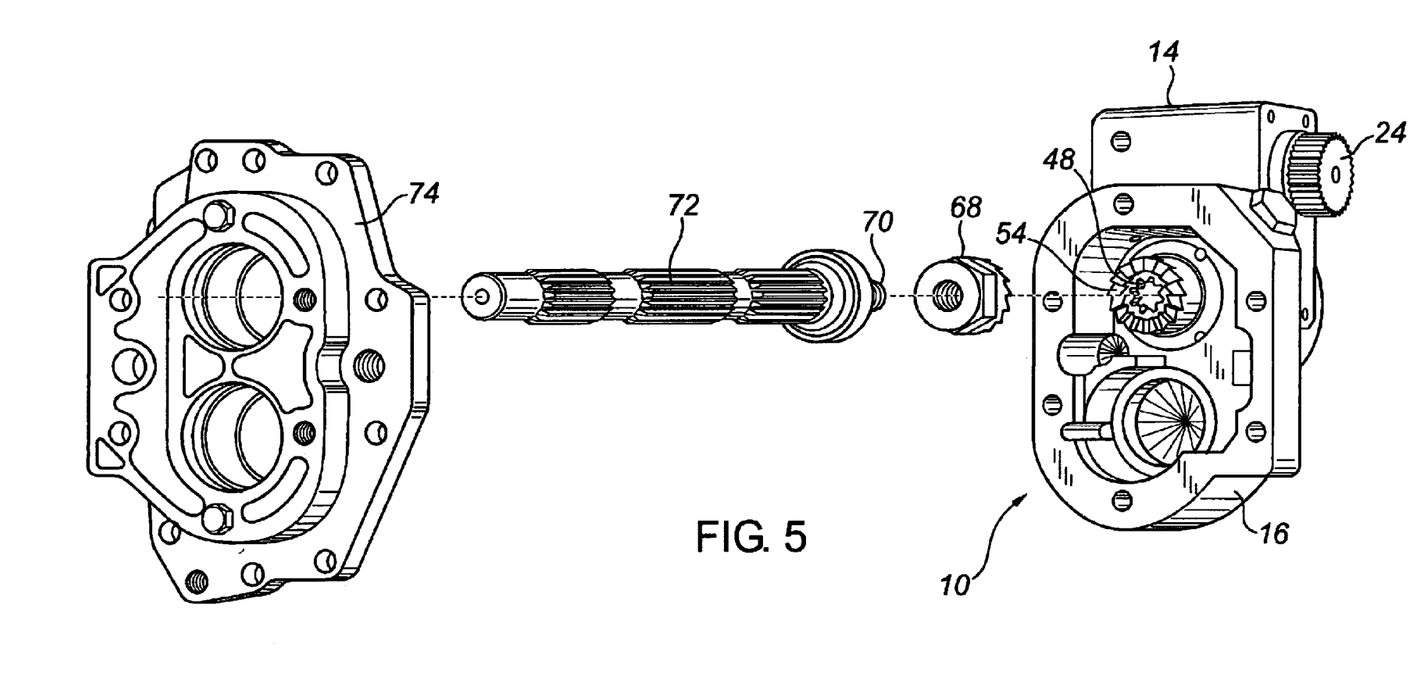
FIG. 5 is a partially exploded detailed perspective view of a clutch engagement from the reverse drive illustrated in FIG. 1.
Figure 7:
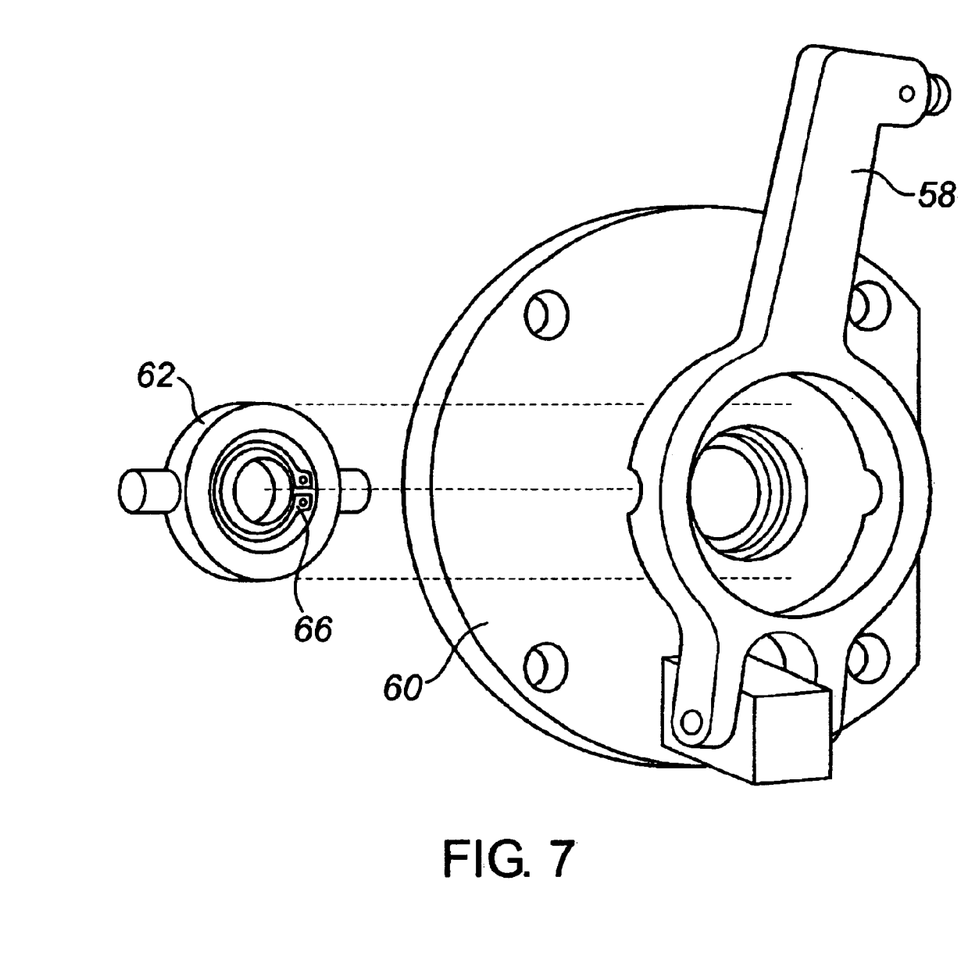
FIG. 7 is a detailed perspective view of the lever illustrated in FIG. 6.
Figure 8:
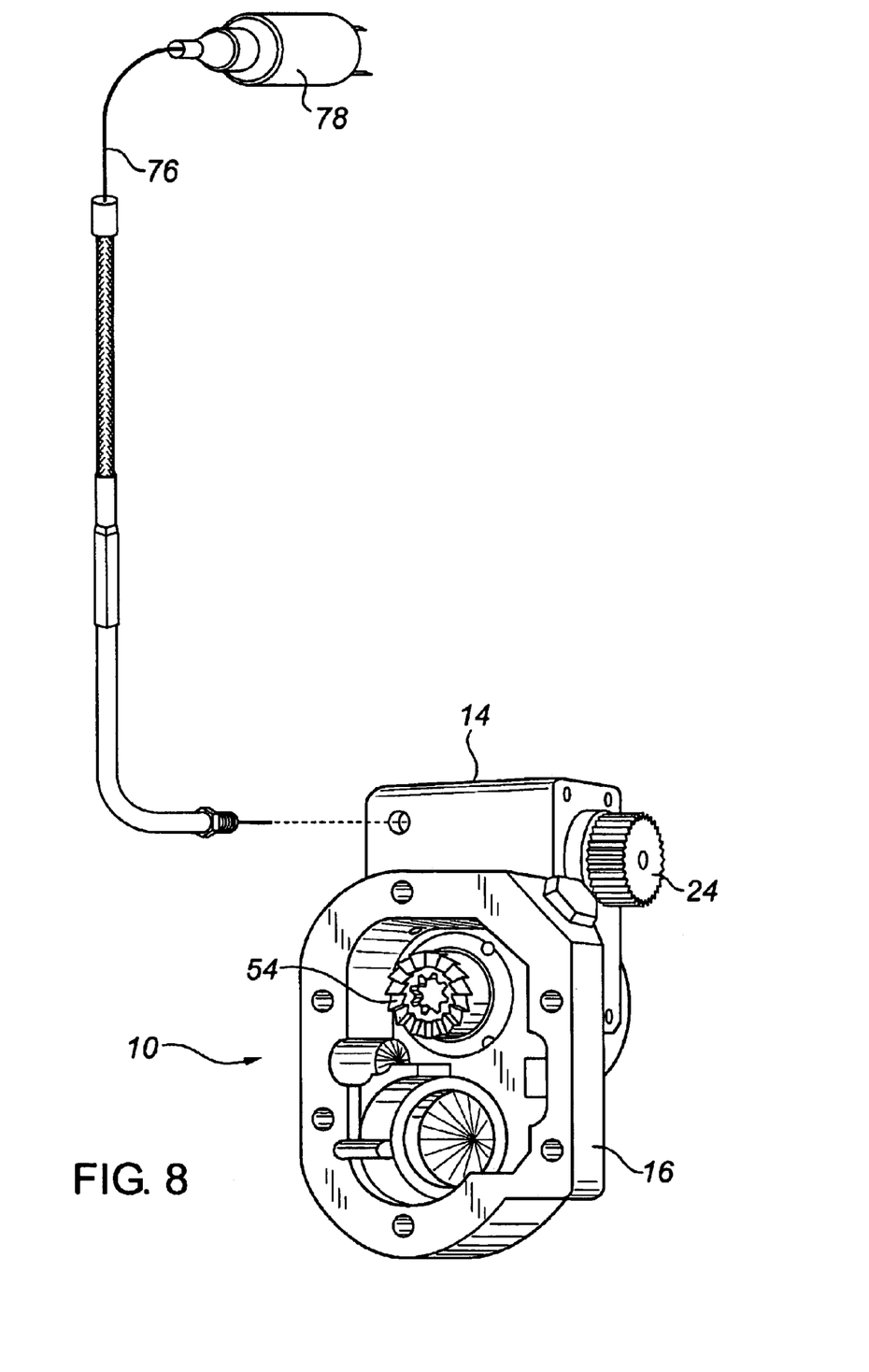
FIG. 8 is a detailed perspective view of a solenoid from the reverse drive illustrated in FIG. 1.
Figure 9:
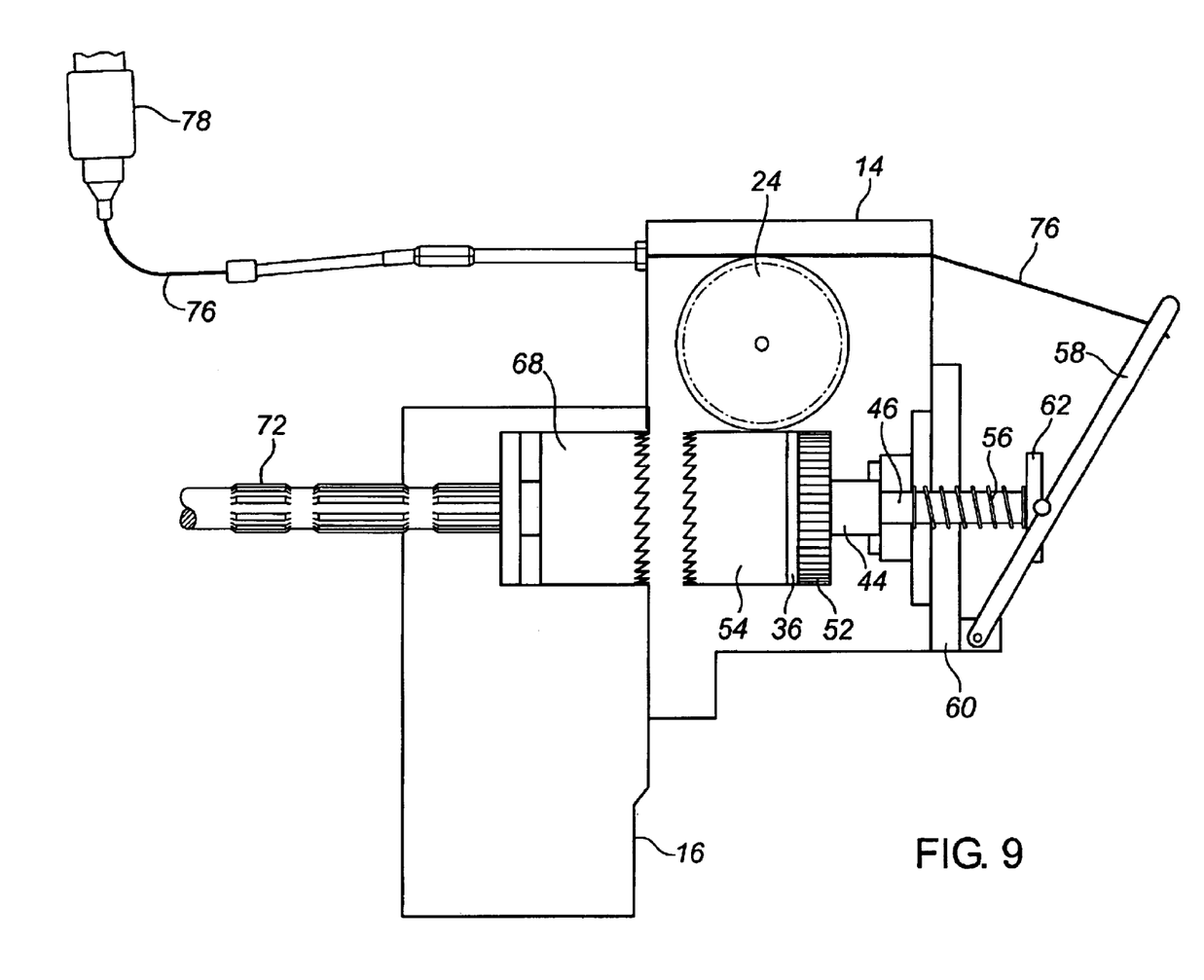
FIG. 9 is a side elevation view, in section, of the reverse drive illustrated in FIG. 1, with the clutch in the disengaged position.
Figure 10:
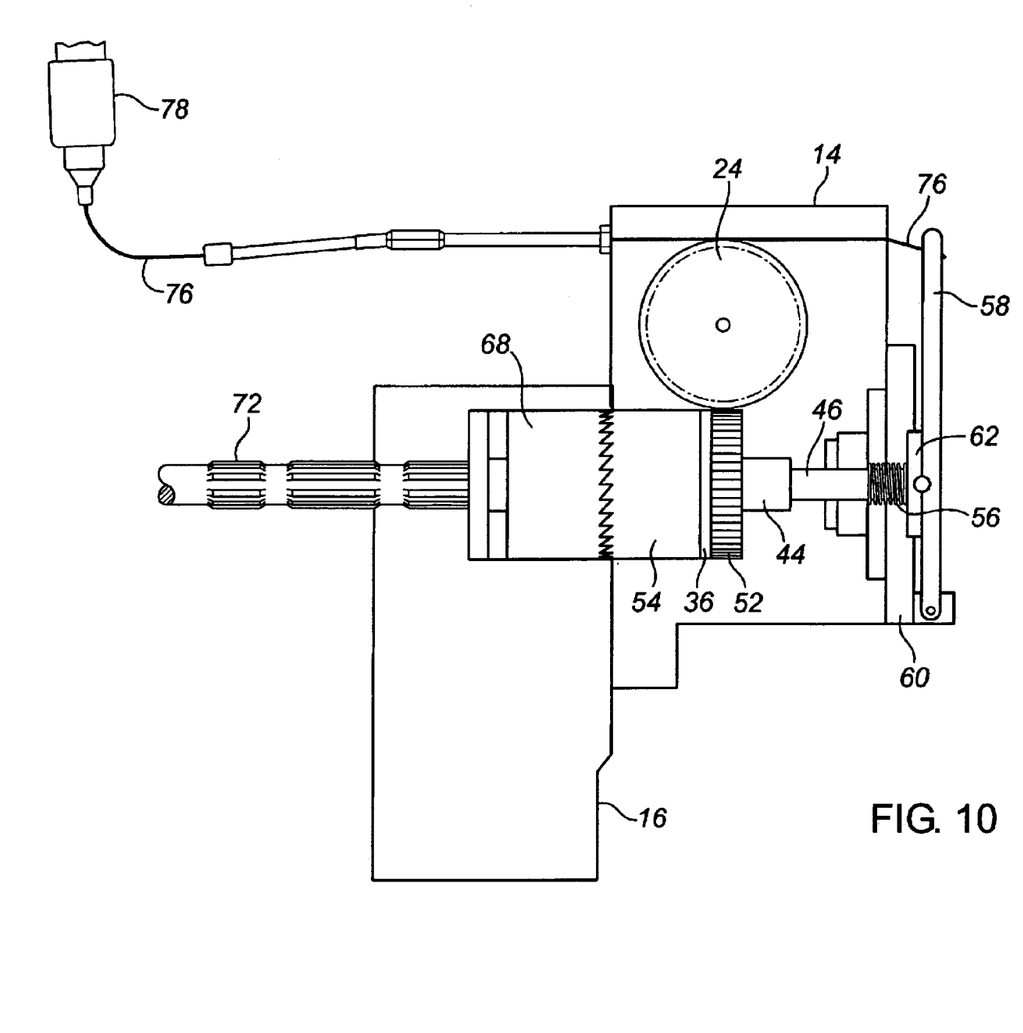
FIG. 10 is a side elevation view, in section, of the reverse drive illustrated in FIG. 1, with the clutch in the engaged position.

Referring to FIG. 3, a clutch 54 is mounted on outer shaft 44 and is non-rotatably coupled to outer shaft 44 through a spline engagement 48. Clutch 54 is coupled to inner shaft 46 by snap rings 43 second end 42 of second shaft 34. Clutch 54 and inner shaft 46 can capable of simultaneously reciprocating movement on and within along outer shaft 44, respectively. Referring to FIGS. 6 and 9, a spring 56 is provided to bias inner shaft 46 in a first axial direction to maintain clutch 54 normally in the disengaged position. Referring to FIG. 10, a lever 58 is provided to move inner shaft 46 in a second axial direction to move clutch 54 to the engaged position. Referring to FIGS. 6 and 7, lever 58 is mounted on a cover 60 that is adapted to be secured to first portion 14 of housing 12. A release bearing 62 with a washer 64 and a snap ring 66 are positioned between cover 60 and lever 58 for maintaining inner shaft 48 in engagement with lever 58. Referring to FIG. 5, in the illustrated embodiment, clutch 54 is a sawtooth clutch adapted to engage a corresponding sawtooth tooth clutch 68 mounted on a remote end 70 of a drive shaft 72. It will be appreciated that other clutch arrangements could also be used. A cover 74 is provided which is adapted to be secured to second portion 16 of housing 12. Referring to FIG. 10, a cable 76 extends from lever 58 to a solenoid 78, such that activation of solenoid 78 exerts a force upon cable 76 to move lever 58.

Operation:

The use and operation of a reverse drive for a small vehicle will now be described with reference to FIGS. 1 through 11.

Figure 11:
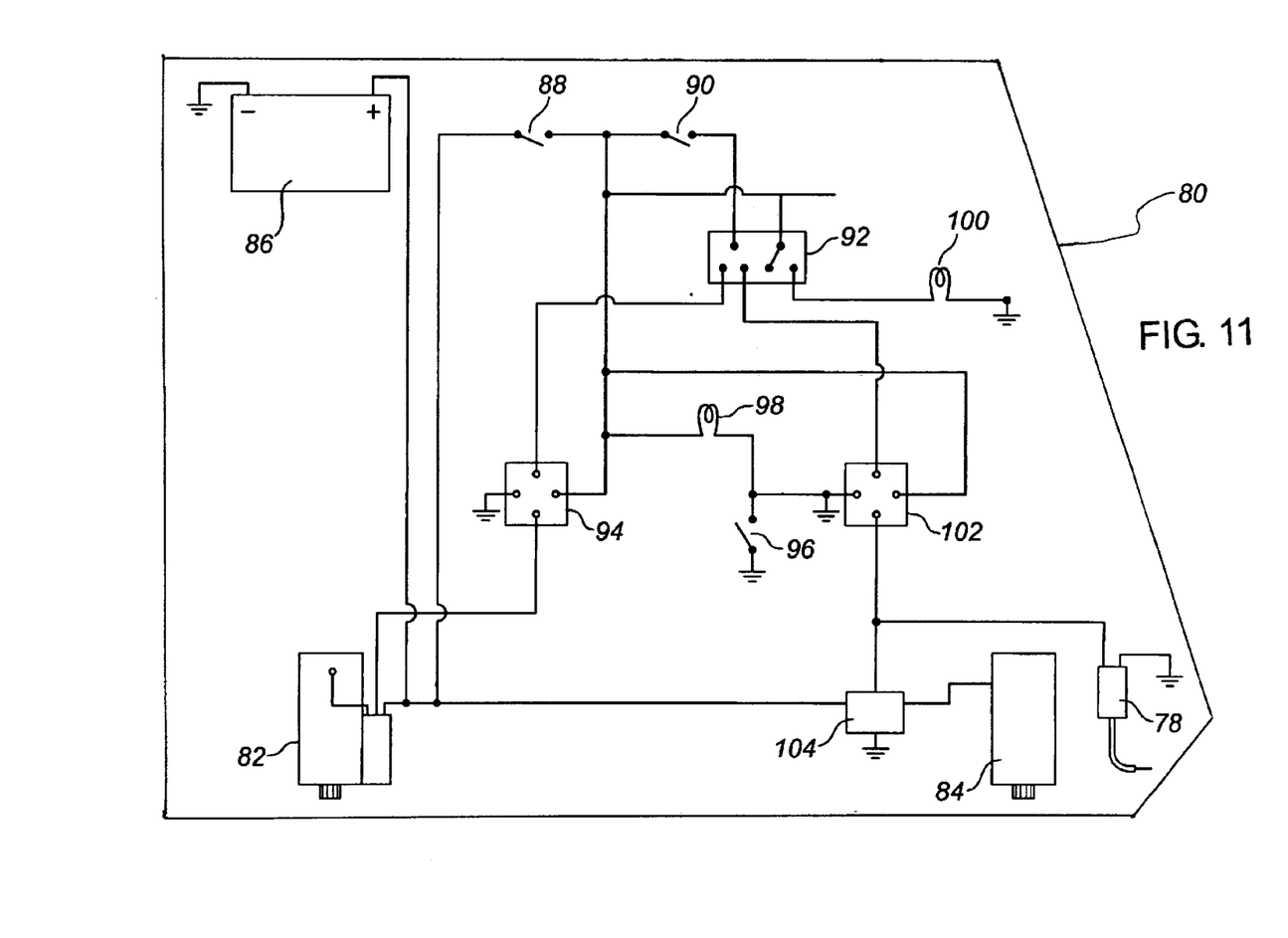
FIG. 11 is a schematic view of the incorporation of the reverse drive illustrated in FIG. 1 into a small vehicle.

Referring to FIG. 11, reverse drive 10, as described above, is adapted for use on small vehicles 80. Small vehicle 80 includes a starter motor 82 and a separate reverse motor 84. A battery 86 is provides power to operate an ignition switch 88, a start/reverse switch 90, a two-mode electric switch 92, a starter relay 94, a neutral switch 96, a neutral light 98, a reverse light 100, a reverse relay 102, solenoid 104 and solenoid 78. Referring to FIG. 10, when reverse mode is selected, solenoid 78 is activated to exert a force upon cable 76 to move lever 58 of reverse drive 10.

Referring to FIG. 1, reverse drive 10 is comparatively compact. External motor 26 engages primary driven gear 24 to impart a rotary motion to first shaft 18. Referring to FIG. 4, worm wheel 52 on second shaft 34 engages and is rotated by worm gear 28 on first shaft 18. A gear reduction is effected through engagement of worm gear 28 and worm wheel 52 so that second shaft 34 rotates at a slower speed than first shaft 18. If desired, the ratio of the gear reduction can be varied by altering the teeth configuration of worm wheel 52. Referring to FIG. 9, clutch 54 on second shaft 34 is normally disengaged from clutch 68 of motor cycle drive shaft 72. Referring to FIG. 3, second shaft 34 consists of outer shaft 44 and concentric inner shaft 46. Clutch 54 is non-rotatably engaged with outer shaft 44 by spline 48, but remains axially movable along outer shaft 44. Referring to FIG. 9, concentric inner shaft 46 engages clutch 54 and extends beyond outer shaft 44 to engage lever 58. Spring 56 biases inner shaft 46 axially to maintain clutch 54 in a normally disengaged position. Referring to FIG. 10, when a force is exerted up solenoid 78 shorten cable 76, lever 58 exerts a force upon inner shaft 46. Lever 58 provides a mechanical advantage to overcome the biasing force of spring 56 and move inner shaft 46 until clutch 54 engages clutch 68 so that force is transmitted to motorcycle drive shaft 72.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the claims.

The embodiments of the invention in which an exclusive property or privilege is claimed are defined as follows:

1. A reverse drive for a small vehicle, comprising:
    a housing;
    a first shaft rotatably mounted in the housing, the first shaft having a first end and a second end, the first end extending outside the housing;
    a primary driven gear mounted on the first end of the first shaft, such that an external motor engaging the primary driven gear imparts a rotary motion to the first shaft;
    a worm gear mounted on and rotating with the first shaft;
    a second shaft rotatably mounted in the housing, the second shaft having a first end and a second end;
    a worm wheel mounted on and rotating with the second shaft, the worm wheel engaging and being rotated by the worm gear with a gear reduction being effected through engagement of the worm gear and the worm wheel so that the second shaft rotates at a slower speed than the first shaft; and
    a clutch being mounted on the second end of the second shaft, the second shaft defining an axis and having an outer shaft and an inner shaft concentric with the outer shaft, the outer shaft having opposed ends, the inner shaft extending past at least one of the opposed ends of the outer shaft, the clutch engaging the inner shaft, the inner shaft being movable along the axis relative to the outer shaft to move the clutch between an engaged position and a disengaged position.

2. The reverse drive as defined in claim 1, wherein the inner shaft includes a lever which moves the inner shaft axially to extend the inner shaft to move the clutch to the engaged position and a spring which moves the inner shaft axially to retract the inner shaft to move the clutch to a disengaged position.

3. The reverse drive as defined in claim 1, wherein the clutch is a sawtooth clutch gear adapted to engage a sawtooth tooth clutch gear mounted on a remote end of a drive shaft.

4. The reverse drive for a small vehicle, comprising:
   a housing;
   a first shaft rotatably mounted in the housing, the first shaft having a first end and a second end, the first end extending outside the housing;
   a primary driven gear mounted on the first end of the first shaft, such that an external motor engaging the primary driven gear imparts a rotary motion to the first shaft;
   a worm gear mounted on and rotating with the first shaft;
   a two component second shaft rotatably mounted in the housing, the second shaft having a first end and a second end, the second shaft having an outer shaft and a concentric inner shaft, the inner shaft being axially movable relative to the outer shaft, the outer shaft having opposed ends, the inner shaft extending past the opposed ends of the outer shaft;
   a worm wheel mounted on and rotating with the outer shaft of the second shaft, the worm wheel engaging and being rotated by the worm gear with a gear reduction being effected through engagement of the worm gear and the worm wheel so that the second shaft rotates at a slower speed than the first shaft; and
   a clutch being non-rotatably mounted on the second shaft and engaged with the inner shaft at the second end of the second shaft so that the clutch moves with the inner shaft;
   a spring being provided to bias the inner shaft in a first axial direction to maintain the clutch normally in the disengaged position; and
   a lever being provided to move the inner shaft in a second axial direction to move the clutch to the engaged position.

5. The reverse drive as defined in claim 4, wherein the clutch is a sawtooth clutch adapted to engage a sawtooth tooth clutch mounted on a remote end of a drive shaft.

6. The reverse drive as defined in claim 4, wherein a cable extends form the lever to a solenoid, such that activation of the solenoid exerts a force upon the cable to move the lever.

7. A device for providing reverse drive to a small vehicle, the device comprising:
   a starter motor;
   a separate reverse motor;
   a battery;
   a switch to engage the reverse motor with a reverse drive, the reverse drive comprising:
      a housing;
      a first shaft rotatably mounted in the housing, the first shaft having a first end and a second end, the first end extending outside the housing;
      a primary driven gear mounted on the first end of the first shaft, such that an external motor engaging the primary driven gear imparts a rotary motion to the first shaft;
      a worm gear mounted on and rotating with the first shaft;
      a second shaft rotatably mounted in the housing, the second shaft having a first end and a second end;
      a worm wheel mounted on and rotating with the second shaft, the worm wheel engaging and being rotated by the worm gear with a gear reduction being effected through engagement of the worm gear and the worm wheel so that the second shaft rotates at a slower speed than the first shaft; and
      a clutch being mounted on the second end of the second shaft, means being provided for moving the clutch between an engaged position and a disengaged position.

8. The device for providing reverse drive as defined in claim 7, wherein the means being provided for moving the clutch between an engaged position and a disengaged position includes having the second shaft with an outer shaft and a concentric inner shaft, the outer shaft having opposed ends, the inner shaft extending past at least one of the opposed ends of the outer shaft, the clutch engaging the inner shaft, the inner shaft being axially movable relative to the outer shaft to move the clutch between the engaged position and disengaged position.

9. The device for providing reverse drive as defined in claim 7, wherein means for selectively move the inner shaft includes a lever which moves the inner shaft axially to extend the inner shaft to move the clutch to the engaged position and a spring which moves the inner shaft axially to retract the inner shaft to move the clutch to a disengaged position.

10. The device for providing reverse drive as defined in claim 7, wherein the clutch is a sawtooth clutch gear adapted to engage a sawtooth tooth clutch gear mounted on a remote end of a drive shaft.

\* \* \* \* \*